US012150045B2

(12) United States Patent
Sasindran et al.

(10) Patent No.: US 12,150,045 B2
(45) Date of Patent: Nov. 19, 2024

(54) PROFILE SELECTION FOR CBRS COMMUNICATION

(71) Applicant: Google LLC, Mountain View, CA (US)

(72) Inventors: Sooraj Sasindran, San Diego, CA (US); Shivank Nayak, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/649,774

(22) Filed: Feb. 2, 2022

(65) Prior Publication Data
US 2022/0159563 A1 May 19, 2022

Related U.S. Application Data

(63) Continuation of application No. 16/452,398, filed on Jun. 25, 2019, now Pat. No. 11,284,339.

(60) Provisional application No. 62/692,165, filed on Jun. 29, 2018.

(51) Int. Cl.
H04W 48/18 (2009.01)
H04L 67/30 (2022.01)
H04W 64/00 (2009.01)
H04W 76/10 (2018.01)

(52) U.S. Cl.
CPC ............ H04W 48/18 (2013.01); H04L 67/30 (2013.01); H04W 64/00 (2013.01); H04W 76/10 (2018.02)

(58) Field of Classification Search
CPC ..... H04W 48/18; H04W 64/00; H04W 76/10; H04W 16/14; H04W 4/025; H04W 8/18; H04L 67/30
See application file for complete search history.

(56) References Cited

U.S. PATENT DOCUMENTS

| 7,813,822 B1 * | 10/2010 | Hoffberg ............... H04N 7/163 381/73.1 |
| 7,958,457 B1 * | 6/2011 | Brandenberg ........ G06F 1/1613 715/811 |
| 8,254,394 B1 * | 8/2012 | Gummalla ............... H04L 5/00 370/395.43 |
| 9,686,370 B2 | 6/2017 | Walker et al. |
| 10,271,351 B1 | 4/2019 | Wang |
| 10,368,351 B1 | 7/2019 | Syed et al. |

(Continued)

FOREIGN PATENT DOCUMENTS

| WO | 2017195152 | 11/2017 |
| WO | 2020006114 | 1/2020 |

OTHER PUBLICATIONS

English Translation of Korean Notice of Allowance mailed Jun. 17, 2022 for Korean Application No. 10-2021-7002297, 3 pages.

(Continued)

Primary Examiner — Atique Ahmed

(57) ABSTRACT

The present disclosure describes one or more aspects for selecting a Citizens Broadband Radio Service (CBRS) profile for communicating with an associated CBRS network. Such aspects may include providing a plurality of CBRS profiles associated with respective CBRS network cells, receiving contextual information surrounding current and past network connections of a user device and/or other user devices, selecting one of the CBRS profiles based on the contextual information, and configuring a modem of the user device to communicate with an associated CBRS network.

20 Claims, 8 Drawing Sheets

(56) References Cited

U.S. PATENT DOCUMENTS

| | | | |
|---|---|---|---|
| 10,743,191 B2 | 8/2020 | Ashrafi | |
| 2002/0023055 A1* | 2/2002 | Antognini | G06K 7/0166 |
| | | | 705/40 |
| 2004/0249927 A1* | 12/2004 | Pezutti | H04L 41/5006 |
| | | | 709/223 |
| 2013/0182625 A1* | 7/2013 | Kuehnel | H04W 76/10 |
| | | | 370/328 |
| 2014/0106753 A1 | 4/2014 | Narasimhan et al. | |
| 2015/0110078 A1 | 4/2015 | White et al. | |
| 2016/0157042 A1 | 6/2016 | Brisebois et al. | |
| 2016/0380989 A1* | 12/2016 | Bailey | H04L 63/08 |
| | | | 726/5 |
| 2017/0134990 A1 | 5/2017 | Egner et al. | |
| 2017/0208454 A1 | 7/2017 | Knisely et al. | |
| 2017/0295578 A1 | 10/2017 | Khoshnevisan et al. | |
| 2018/0042018 A1 | 2/2018 | Bhushan et al. | |
| 2018/0098247 A1* | 4/2018 | Gopal | H04B 7/18519 |
| 2018/0139616 A1 | 5/2018 | Khoshnevisan et al. | |
| 2018/0167825 A1* | 6/2018 | Egner | H04W 16/16 |
| 2018/0167948 A1 | 6/2018 | Egner et al. | |
| 2019/0007990 A1 | 1/2019 | Kaliaperumal et al. | |
| 2019/0037418 A1* | 1/2019 | Gunasekara | H04W 24/02 |
| 2019/0090309 A1 | 3/2019 | Wong et al. | |
| 2019/0141624 A1* | 5/2019 | Wong | H04W 48/18 |
| 2019/0150134 A1 | 5/2019 | Kakinada et al. | |
| 2019/0174453 A1 | 6/2019 | Olofsson et al. | |
| 2019/0192768 A1 | 6/2019 | Gupta et al. | |
| 2020/0008138 A1 | 1/2020 | Sasindran et al. | |
| 2021/0114616 A1* | 4/2021 | Altman | H04W 8/205 |

OTHER PUBLICATIONS

"Foreign Office Action", IN Application No. 202147003096, Jan. 6, 2022, 7 pages.

"Foreign Office Action", KR Application No. 10-2021-7002297, Nov. 30, 2021, 14 pages.

"International Preliminary Report on Patentability", Application No. PCT/US2019/039299, Dec. 29, 2020, 9 pages.

"International Search Report and Written Opinion", Application No. PCT/US2019/039299, Oct. 1, 2019, 14 pages.

"Non-Final Office Action", U.S. Appl. No. 16/452,398, filed May 10, 2021, 18 pages.

"Non-Final Office Action", U.S. Appl. No. 16/452,398, filed Sep. 25, 2020, 22 Pages.

"Notice of Allowance", U.S. Appl. No. 16/452,398, filed Feb. 23, 2021, 18 pages.

"Notice of Allowance", U.S. Appl. No. 16/452,398, filed Nov. 10, 2021, 11 pages.

"Signaling Protocols and Procedures for Citizens Broadband Radio Service (CBRS): Spectrum Access System (SAS)—Citizens Broadband Radio Service Device (CBSD) Interface Technical Specification", Spectrum Sharing Committee Work Group 3 (Protocols); SAS-CBSD TS; WINNF-16-S-0016-V1.0.1, Dec. 22, 16, 62 pages.

Palola, et al., "Field Trial of the 3.5 GHz Citizens Broadband Radio Service Governed by a Spectrum Access System (SAS)", VTT Technical Research Centre of Finland Ltd, Oulu, Finland, Mar. 12, 2018, 22 pages.

European Office Action mailed Feb. 6, 2023 for EP Application No. 19740663.0, 11 pages.

English Translation of Chinese Office Action mailed May 31, 2023 for Chinese Application No. 201980042268.2, 22 pages.

European Notice of Allowance mailed Oct. 19, 2023 for EP Application No. 19740663.0, 53 pages.

Translation of Indian Intimation of Grant mailed Mar. 15, 2024 for IN Application No. 202147003096, 1 page.

Extended European Search Report mailed Apr. 25, 2024 for EP Application No. 24158442.4, 9 pages.

\* cited by examiner

PROFILE SELECTION FOR CBRS COMMUNICATION

RELATED APPLICATION

This application is a continuation of, and claims priority to, U.S. Utility patent application Ser. No. 16/452,398, filed on Jun. 25, 2019, which, in turn, claims priority under 35 U.S.C. § 119(e) to U.S. Provisional Patent Application 62/692,165, filed on Jun. 29, 2018 which are incorporated herein by reference in their entireties.

BACKGROUND

Wireless communication has become a leading medium for accessing and receiving data. In many cases, a user device communicates through cellular data networks (e.g., GSM, CDMA, LTE, 3G, 4G, 5G, etc.) that operate within an administratively licensed band, such that only licensed cellular network operators are permitted to establish data networks (each a "primary cellular data network") within the licensed band. The licensed operators are allocated respective spectra within the licensed band which prevents unlicensed operators from utilizing the licensed band.

To connect with a primary cellular data network, the user device utilizes a subscription profile that is administered by an associated network operator. The subscription profile generally includes an international mobile subscriber identity (IMSI) number and its related key. The subscription profile is stored on the user device and provides the user device with network access information for access to the associated primary cellular data network. A single subscription profile may allow the user device to connect to multiple associated primary cellular data network nodes such that the user device can communicate with the associated primary cellular data network within a wide geographic area.

Citizens Broadband Radio Service (CBRS) is an unlicensed radio frequency band, in the 3.5 GHz spectrum, that has been approved for shared civilian wireless data communication use. CBRS band networks are similar to primary cellular data networks, however, CBRS band use does not require a costly exclusively licensed spectrum license from an administrative body. As such, many different entities (e.g., hospitals, educational institutions, coffee shops, stadiums, shopping malls) may be able to provide data access for user devices through a CBRS network. CBRS also provides many advantages over wireless local area network (WLAN) network data access (e.g., Wi-Fi), as WLAN frequency bands tend to be very crowded, which can result in poor connections and slow data transfer speeds.

An issue with using the CBRS band is that a separate CBRS profile or certificate (collectively "CBRS profile") is needed to access a particular CBRS network (as opposed to primary cellular data networks where a single profile may be used). As a result, multiple CBRS profiles need to be stored on the user device or a remote service for access to the various CBRS networks the user device may enter into the region of connectivity for. For example, to access five different CBRS networks, five different CBRS profiles may be needed.

This leads to a problem of selecting the right CBRS profile at a region of connectivity. The currently available approach is for the user device to scan the available CBRS frequency band using a modem of the user device, determine if a CBRS network is available, determine if the user device has access to the CBRS network, and if multiple CBRS networks are available which the user device has access to—which CBRS profile is the right profile to utilize. This process may take the order of seconds and sometimes minutes to complete. There is a need to be able to attach to a CBRS network as soon as the user device enters the region of connectivity to optimize CBRS acquisition while minimizing negative effects on a primary cellular data network and minimizing overall user device power consumption.

Another difficulty with utilizing the CBRS band, is that it uses a same protocol modem as the primary cellular data network. Thus, the protocol modem can connect to a CBRS network or a primary cellular data network, but generally not multiple networks concurrently. Accordingly, improving confidence that a CBRS data connection is available and reliable before switching from a primary cellular data network connection or from another CBRS network connection can prevent poor or lost data connections.

Additionally, the traditional manner of selecting a data network (including primary cellular data networks, CBRS networks, and WLAN networks) involves utilizing the modem of the user device to scan for available networks and then connecting to one of the networks. While this technique works, it is often very slow and can lead to dropped connections due to poor handoff situations between cells or networks. Accordingly, there exists a need to select an appropriate CBRS profile for a given device context (e.g., location, traffic, time of day) before the results of a modem scan are received or without utilizing the results of a modem scan, such that the user device can switch between a primary cellular data network and an associated CBRS network quickly and reliably.

SUMMARY

The present disclosure describes one or more aspects for selecting a Citizens Broadband Radio Service communication profile (hereinafter "CBRS profile") for a data connection based on contextual data associated with a user device. The contextual data used for the selection may include at least one of the Subscriber Identity Module (SIM) profile currently selected on the user device, geolocation data, mobility zone information of the user device, a CBRS network cell measured by the user device, a CBRS network cell acquired by the user device, a radio access network (RAN) connection measured by the user device, a RAN connection acquired by the user device, a radio frequency band measured by the user device, a radio frequency band acquired by the user device, average data throughput obtained by the user device, or a time. In this way, a user device or a remote service can select an appropriate CBRS profile for a given device context while minimizing time delays in connecting to CBRS data networks and handoffs between a source network and the selected CBRS network.

In some aspects, a method for a user device to select a CBRS profile is described. As part of the method, the user device receives and stores a plurality of CBRS profiles that can be used by the user device. Then, based on received contextual data, the user device selects an appropriate CBRS profile and configures a modem to connect to the associated CBRS network cell. The method continues by the user device communicating with the associated CBRS network cell using the selected CBRS profile.

In other aspects, a method for a remote service to select a CBRS profile is described. As part of the method, the remote service receives and stores a plurality of CBRS profiles that can be used by a user device. Then, based on received contextual data, the remote service selects an appropriate CBRS profile and sends the selected CBRS profile to the user device such that the user device can configure a modem to connect to the associated CBRS network cell. The method continues by the user device communicating with the associated CBRS network cell using the selected CBRS profile.

In further aspects, a system is described. The system includes a processor and computer-readable storage media (CRM) containing instructions that, when executed by the processor, cause the system to select a CBRS profile. The system receives a plurality of CBRS profiles and contextual information about the system. The contextual information is used to select one of the CBRS profiles. The CBRS profile is used to configure a modem of the system to connect to an associated CBRS network cell such that the system can communicate with an access point of the CBRS network cell.

In yet other aspects, a system is described. The system includes a processor and computer-readable storage media (CRM) containing instructions that, when executed by the processor, cause the system to select a CBRS profile. The system receives a plurality of CBRS profiles and contextual information about a user device. The contextual information is used to select one of the CBRS profiles. The selected CBRS profile is then sent to the user device and used to configure a modem of the user device to connect to an associated CBRS network cell such that the user device can communicate with an access point of the CBRS network cell.

Although the methods and systems described herein reference wireless communication in the CBRS band, the methods and systems described herein may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol (e.g., 4G), an LTE Advanced protocol, a 5$^{th}$ Generation (5G) New Radio (NR) protocol, or a future advanced protocol. The protocol may operate based on frequency division duplexing (FDD) or time division duplexing (TDD), or both. The wireless connection may operate over a high bandwidth, such as a bandwidth greater than 1 GHz. Further, the wireless connection may be configured to allow for operation at high frequencies, such as frequencies above 3 GHz, as well as lower frequencies, such as those between 0.5 GHz and 3 GHz.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects for selecting a CBRS profile for CBRS communication. The use of the same reference numbers in different instances in the description and the figures may indicate like elements.

DETAILED DESCRIPTION

With facility to access both the primary cellular data network and a CBRS network, a user device can be provided with the ability to enable a dynamic dual standby mode wherein the user device can activate data on the primary cellular data network or on a selected CBRS network when corresponding coverage is available. The user device can also switch between a first CBRS network and a second CBRS network. This is similar to a Dual SIM Dual Standby operation wherein cellular modem architecture contains wireless protocol stacks that reside in the same user device (which may or may not be on same modem chip) and share some or all of the associated radio frequency (RF) resources.

Before switching to a second CBRS network from a primary cellular data network or from a first CBRS network, a CBRS profile corresponding to the second CBRS network is first selected from a library of CBRS profiles. Because any number of CBRS networks can exist along with any number of associated CBRS profiles, an appropriate CBRS profile should be chosen for a given situation, especially in light of the fact that network data from the primary cellular data network is not available when connected to the CBRS network. Because modem scans require a large amount of time, a faster way to select a CBRS profile is needed. Accordingly, methods and systems are described that allow selection of an appropriate CBRS profile based on contextual information about the user device.

Operating Environment

Figure 1:
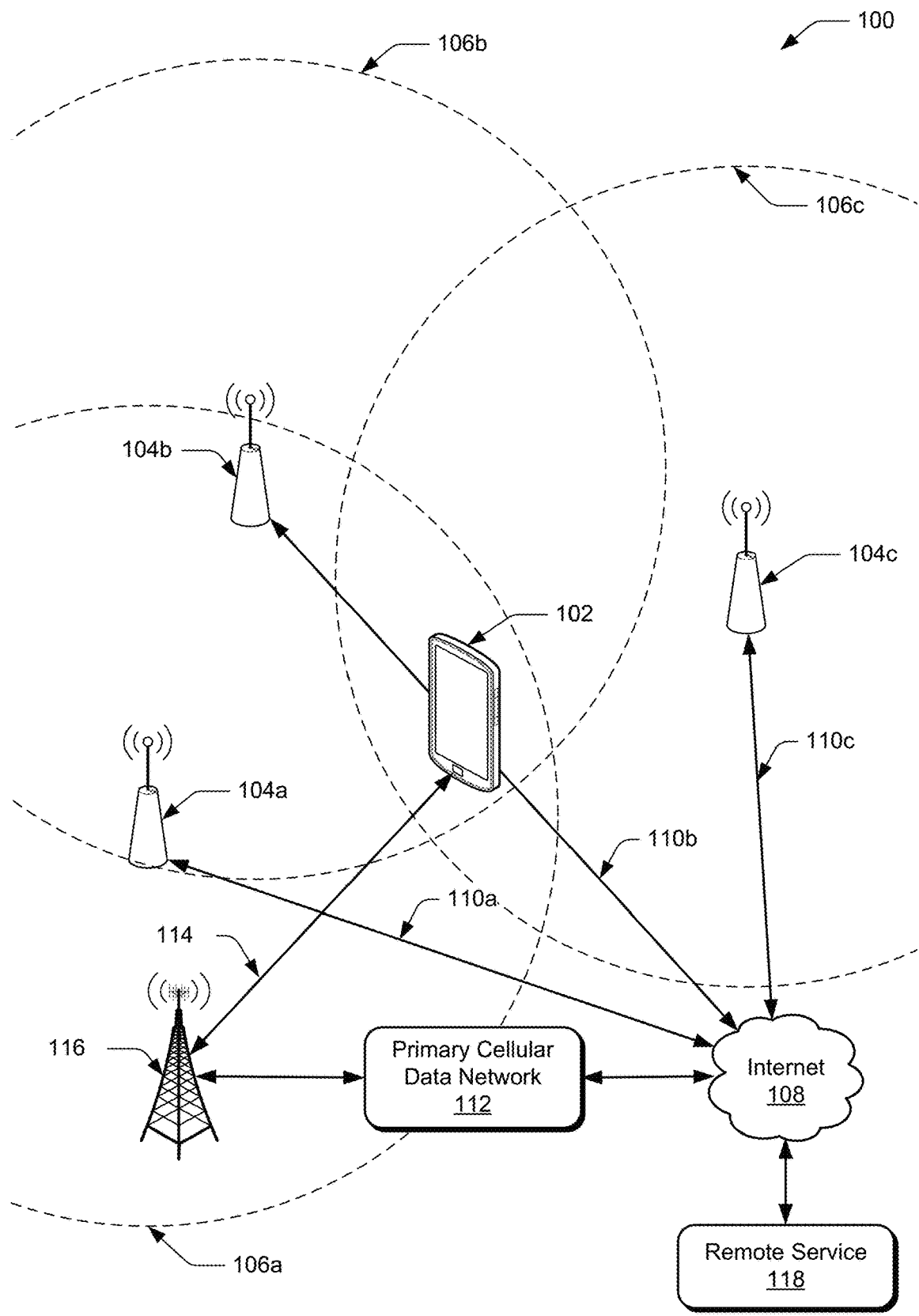
FIG. 1 illustrates an example operating environment in which a CBRS profile is selected and implemented on a user device.

FIG. 1 illustrates an example operating environment 100 in which a user device or a remote service can select a CBRS profile for CBRS communication and in which the user device can implement the selected CBRS profile. In this example, the operating environment 100 includes user device 102 and one or more CBRS access points 104 (CBRS access point 104a, CBRS access point 104b, CBRS access point 104c), which provide respective CBRS network cells 106 (CBRS network cell 106a, CBRS network cell 106b, CBRS network cell 106c). The CBRS network cells 106 connect to the Internet 108 via at least one network connection 110 (connection 110a, connection 110b, connection 110c). A CBRS access point 104 is a networking hardware device (base station) that allows wireless devices to connect to a network. The CBRS access points 104 may be configured as any wireless access point that supports communication in the CBRS band to provide location and data service to user devices as well as access to the Internet 108. CBRS access points may also be configured to deliver other forms of connectivity in conjunction with CBRS, e.g., Wi-Fi, ethernet, cellular. Furthermore, any CBRS protocols and/or CBRS profile characteristics may be utilized without departing from the scope of the disclosed embodiments. The connections 110 between the CBRS access points 104 and the Internet 108 may be implemented using any known wired/wireless communication protocols and may involve various intermediary devices (e.g., routers, switches).

Although three CBRS networks are illustrated in FIG. 1, any number of CBRS networks can be within the communication range of user device 102. Furthermore, a CBRS network may be within communication range of user device 102, however user device 102 may not be able to use a CBRS profile for connecting with that CBRS network (for example, if a subscription is needed). In some implementations, a single CBRS network may have multiple corresponding cells (e.g. access points in multiple retail locations). A single CBRS profile may allow for access to multiple cells of the CBRS network (similar to primary cellular data network 112) or different CBRS profiles may be needed for each individual CBRS cell even though they are in a same network.

Prior to connecting with a particular CBRS access point 104, the user device 102 may be connected to Internet 108 via communication with a primary cellular data network 112 via wireless connection 114 with base station 116. In this way, the user device 102 can communicate with a remote service 118 to receive information for use by the user device 102 in order to select a CBRS profile. Alternatively, remote service 118 can select a CBRS profile for user device 102 and transmit the selected CBRS profile or an indication of the selected CBRS profile over wireless connection 114 to the user device 102 for implementation. The user device 102 may connect to the Internet 108 via any wired or wireless connection in order to communicate with remote service 118. The primary cellular data network 112 is shown because that is the default data connection when no other data connections are available. In some embodiments, however, the user device 102 may communicate with remote service 118 using a wireless local network (e.g. Wi-Fi, Bluetooth, a currently implemented CBRS profile) or a wired local network (e.g. ethernet).

Although FIG. 1 depicts the user device 102 as a smartphone, the user device 102 may instead be any user device with wireless communication capabilities (e.g., a mobile gaming console, a tablet, a laptop, an advanced driver assistance system (ADAS), handset, a communication system of an automobile, a point-of-sale (POS) terminal, a health monitoring device, a drone, a camera, a media-streaming dongle, a wearable smart-device, an internet-of-things (IoT) device, a personal digital assistant, a navigation device, a mobile-internet device (MID), a wireless hotspot, a femtocell, a broadband router).

Remote service 118 may be implemented as a server, database, or other computing device that is remote to the user device 102. As discussed above, the remote service 118 may communicate with user device 102 via the Internet 108 through any applicable protocols. For example, as described in relation to FIG. 9, in order to transmit a selected CBRS profile for use by the user device 102, the remote service 118 may communicate with the user device 102 via primary cellular data network 112.

Example Devices

Figure 2:
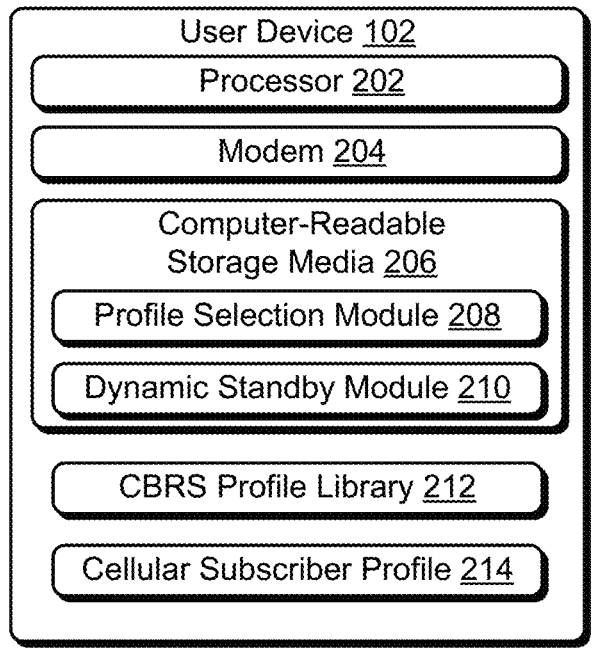
FIG. 2 illustrates an example user device.

FIG. 2 illustrates an example user device 102 which selects and implements a CBRS profile for communication via an associated CBRS profile. The user device 102 includes a processor 202 and a modem 204 that supports communication protocols associated with the CBRS network cells 106a, 106b, and 106c. An example communication protocol associated with the CBRS network cells 106a, 106b, and 106c includes, but is not limited to, a Long Term Evolution (LTE) band 48 operating around 3.5 GHz. The modem 204, which is hardware-based, may be a same modem used for cellular communication (e.g., GSM, CDMA, LTE, 3G, 4G, 5G) or may be a separate modem. The user device 102 also includes computer-readable storage media (CRM) 206 that stores modules of code or executable instructions in the form of a profile selection module 208 and dynamic standby module 210.

The profile selection module 208 is implemented at least partially in hardware and uses contextual information and a CBRS profile library 212 of CBRS profiles to select a CBRS profile.

The CBRS profile library 212 can be stored on a removable card of the user device 102 (such as a subscriber identity module (SIM) card or flash memory card), stored within memory of the user device 102, stored within hardware of the user device 102 as an embedded integrated circuit (e.g., an eSIM), stored within computer-readable storage media 206, or stored elsewhere on the user device 102.

The profile selection module 208 may enable the user device 102 to select a CBRS profile as soon as the user device 102 enters a region of connectivity (e.g., CBRS network cell, coverage area, service area) associated with the selected CBRS profile. The CBRS profile selected can be changed any number of times based on changed contexts of the user device 102 (e.g., location, congestion, time).

The dynamic standby module 210 is implemented at least partially in hardware, and is configured to switch the current data connection profile of the modem 204 between a currently selected first CBRS profile and a second CBRS profile, or between a cellular subscriber profile 214 and a CBRS profile. In some implementations, the user device 102 may cache a selected CBRS profile (such as by the profile selection module 208) for quick access by the dynamic standby module 210.

The cellular subscriber profile 214 can be stored on a removable card of the user device 102 (such as a subscriber identity module (SIM) card or flash memory card), stored within memory of the user device 102, stored within hardware of the user device 102 as an embedded integrated circuit (e.g., an eSIM), stored within computer-readable storage media 206, or stored elsewhere on the user device 102. The cellular subscriber profile 214 is used to connect to primary cellular data network 112 via connection 114.

The processor 202 of the user device 102 can execute modules of instructions or code stored by the CRM 206 to cause the user device 102 to perform operations or implement various device functionalities. In some cases, the processor 202 is an application processor (e.g., multicore processor) or a system-on-chip (SoC) with other components of the user device 102 integrated therein. The CRM 206 may include any suitable type of memory media or storage media (e.g., read-only memory (ROM), programmable ROM (PROM), random access memory (RAM), static RAM (SRAM), Flash memory). In the context of this discussion, the CRM 206 of the user device 102 is a hardware-based storage media, which does not include transitory signals or carrier waves.

In some cases, the CRM 206 stores one or more of firmware, an operating system, or applications of the user device 102 as modules of instructions, code, or information. The processor 202 executes the modules of instructions or code to implement various functionalities of the user device 102. In this example, the CRM 206 includes stored modules of instructions or code for implementing one or more functions associated with selecting an appropriate CBRS profile for a given context of the user device 102. Aspects related to functioning of the profile selection module 208 and the dynamic standby module 210 are described in relation to FIG. 4.

Figure 3:
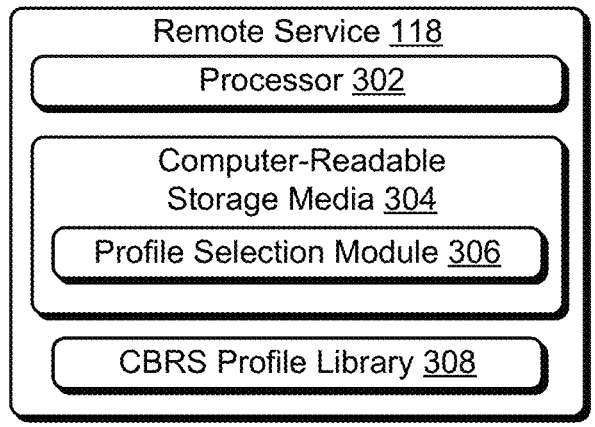
FIG. 3 illustrates an example remote service.

FIG. 3 illustrates an example remote service 118 that selects a CBRS profile for communication to the user device 102 such that the user device 102 can implement the selected CBRS profile. The remote service 118 may be implemented as/hosted by a remote server which includes a processor 302 and transceiver to communicate with the user device 102 (e.g. via wireless connection 114). The remote service 118 also includes computer-readable storage media (CRM) 304 that stores modules of code or executable instructions in the form of a profile selection module 306.

The profile selection module 306 is implemented at least partially in hardware, uses contextual information and a CBRS profile library 308 of CBRS profiles to select a CBRS profile. The CBRS profile library 308 can be stored within computer-readable storage media 304 or stored elsewhere on the remote service 118.

The profile selection module 306 may enable the remote service 118 to select a CBRS profile as soon as the user device 102 enters a region of connectivity (e.g., CBRS network cell, coverage area, service area) associated with the selected CBRS profile. The profile selection module 306 may receive location information from the user device 102 or send requests to the user device 102 for location information. The CBRS profile selected can be changed any number of times based on changed contexts of the user device (e.g., location, congestion, time). In some implementations, the user device 102 may request that the remote service 118 provide a CBRS profile. In other implementations, the remote service 118 may "push" selected CBRS profiles to the user device 102 at given intervals, when the environment of the user device changes, or based on any other context.

The processor 302 of the remote service 118 can execute modules of instructions or code stored by the CRM 304 to cause the remote service 118 to perform operations or implement various device functionalities. In some cases, the processor 302 is an application processor (e.g., multicore processor) or a system-on-chip (SoC) with other components of the remote service 118 integrated therein. The CRM 304 may include any suitable type of memory media or storage media, such as read-only memory (ROM), programmable ROM (PROM), random access memory (RAM), static RAM (SRAM), or Flash memory. In the context of this discussion, the CRM 304 of the remote service 118 is a hardware-based storage media, which does not include transitory signals or carrier waves.

In some cases, the CRM 304 stores one or more of firmware, an operating system, or applications of the remote service 110 as modules of instructions, code, or information. The processor 302 executes the modules of instructions or code to implement various functionalities of the remote service 110. In this example, the CRM 304 includes stored modules of instructions or code for implementing one or more functions associated with selecting an appropriate CBRS profile for a given context of the user device 102. Aspects related to the profile selection module 306 and how it is used to select a CBRS profile from the CBRS profile library 308 is described in relation to FIG. 5.

Example Data Flows

Figure 4:
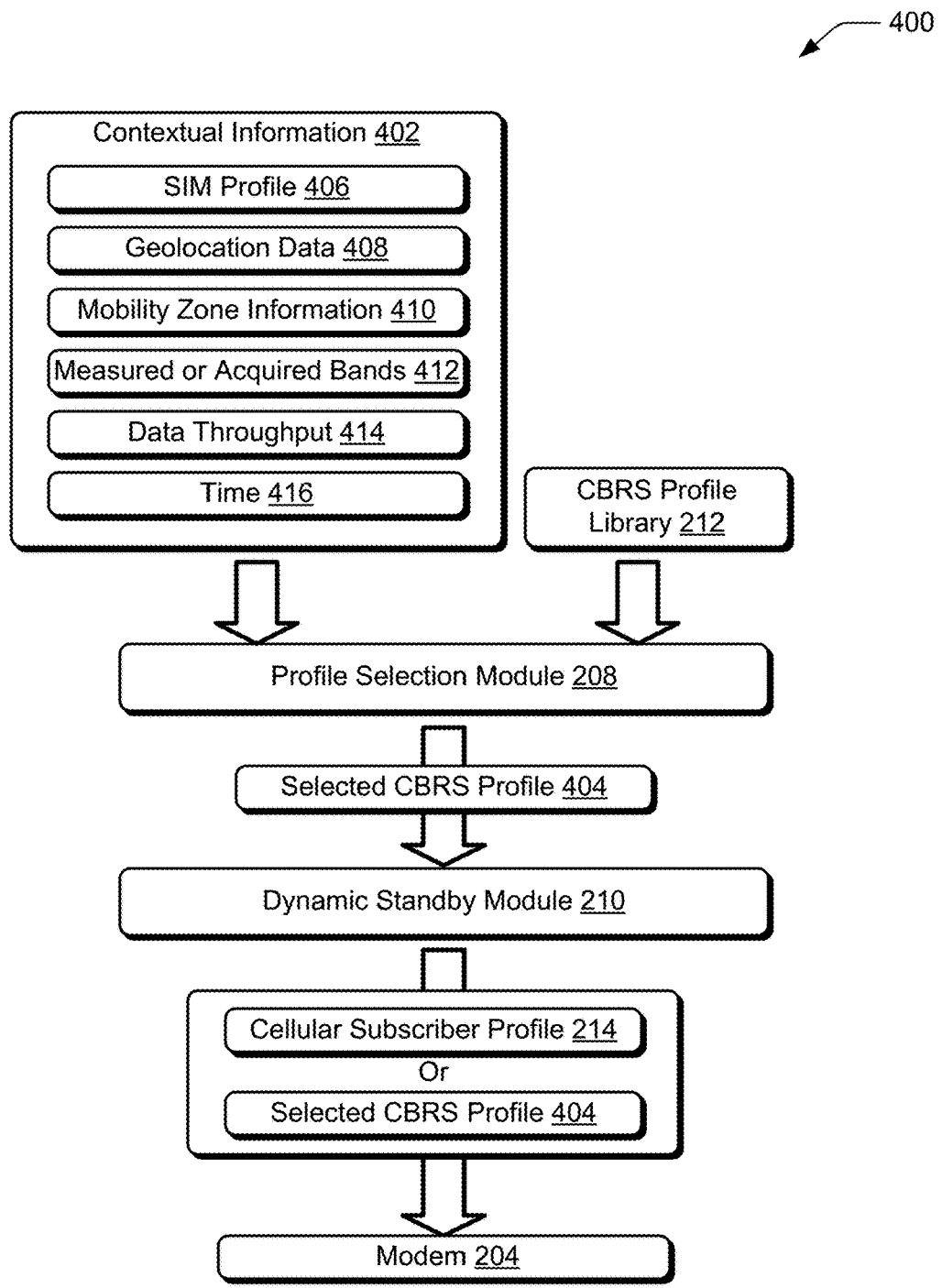
FIG. 4 illustrates details of selecting and implementing a CBRS profile by a user device.

FIG. 4 illustrates data flows 400 of a profile selection module 208 and a dynamic standby module 210 supporting CBRS profile selection and implementation on a user device. The profile selection module 208 receives contextual information 402 (either locally from user device and/or from remote service) along with a CBRS profile library 212 and outputs a selected CBRS profile 404.

As discussed above, the CBRS profile library 212 contains a plurality of CBRS profiles that have been previously acquired by the user device 102 and are available to use for CBRS communication. CBRS profiles within the CBRS profile library 212 can correspond to certain CBRS providers, CBRS network cell locations, businesses, and so on. CBRS profiles may be obtained by at least one of being downloaded by the user device 102 (e.g. via Internet 108, from remote service 118), pushed from remote service 118, batch updated, manually installed, or transferred from another device. As will be discussed further in relation to FIG. 6, any number of usable CBRS profiles (for example within communication range of the user device) may exist in any location.

The contextual information 402 of the user device 102 may include any number of aspects that are usable by the profile selection module 208 to determine selected CBRS profile 404. These aspects may include one or more of a SIM profile 406, geolocation data 408, mobility zone information 410, measured or acquired bands 412, data throughput 414, or time information 416. Such aspects may correspond to conditions (e.g. current, historical) around user device 102 or connections of user device 102 with various CBRS network cells. The aspects may also correspond to conditions (e.g. current, historical) around other user devices or connections of the other user devices with the various CBRS network cells. Portions of contextual information 402 may be shared between user device 102 and remote service 118 such that the profile selection module 208 may leverage information available at remote service 118.

The SIM profile 406 may comprise a user profile of the user device 102. In aspects, the SIM profile 406 may be the cellular subscriber profile 214 or may be a different user profile. SIM profile 406 may reside on a physical card (e.g., SIM card) or may be contained within the computer-readable storage media 206. The SIM profile 406 is the SIM profile currently selected on the user device.

Geolocation data 408 may comprise a physical location or movement of user device 102. Geolocation data 408 may be received from a Global Navigation Satellite System (GNSS) unit of user device 102, may be determined by the user device 102 based on received radio signals (e.g., radio triangulation, ping, wireless connections, phone calls), may be based on sensor data from one or more sensors, may be based on user input, generated by remote service 118, or may come from another source. Geolocation data 408 is usable by profile selection module 208 to narrow CBRS profiles in CBRS profile library 212 to those that correspond to local CBRS network cells. Geolocation data 408, when periodically sent and correlated with multiple other user devices in a particular location, may give estimates of available CBRS networks at the location along with coverage details.

Mobility zone information 410 may comprise an estimated movement of the device and may utilize geolocation data 408. For example, the mobility zone information 410 may be based on changes in network data that occurred between two updates to a server in combination with a location change of the device. Mobility zone information may come from the primary cellular data network 112. The change in network data determines a network quality variation (e.g., change in signal, throughput) between the updates, that is used along with a location change (from geolocation data 408) that occurred between the two updates in order to predict the mobility zone information 410 (e.g., how far the device may go before a future network update). In this way, the gathered network data along with geolocation data 408 may be used to provide feedback to the system to improve the system's confidence level on future CBRS profile suggestions.

Measured or acquired bands 412 may comprise primary cellular network data connections, radio access technology (RAT) connections, or other currently acquired or measured networks by user device 102. Measured or acquired bands 412 can further include other user devices proximal to user device 102. Measured or acquired bands may also comprise past measured or acquired connections from the user device 102 or from other user devices.

Data throughput 414 is based on actual data throughput received by the user device 102 or other user devices for various CBRS network cells. Data throughput 414 may be based on current or past connections between one or more of the user device 102 or other user devices and the various CBRS network cells. Data throughput 414 may be used to rank a plurality of CBRS network cells that may all have sufficient signal strength at a given location.

Time information 416 refers to chronological information (e.g., time of day, a day of the week, a season or time of year, time intervals, holidays, current event). Because data throughput, congestion, and network load are generally all functions of these aspects, profile selection module 208 may utilize time information 416 to determine the selected CBRS profile 404.

The contextual information 402 may be compiled and analyzed by profile selection module 208 to determine a CBRS profile to select. The selected CBRS profile 404 is then sent by profile selection module 208 to the dynamic standby module 210. As discussed above, dynamic standby module 210 is able to dynamically configure modem 204 from either cellular subscriber profile 214 or a current CBRS profile to selected CBRS profile 404 (similar to existing dual-SIM dual-standby techniques). As the contextual information changes, so too may the selected CBRS profile 404. Dynamic standby module 210 receives any updates to the selected CBRS profile 404 from the profile selection module 208, such that the modem 204 is being configured with a current CBRS profile for a particular user on a particular location given the current contextual information 402. Successful CBRS connections may be stored in a local cache history for the user device 102 such that the system can update previous connection data for given device contexts. Similar data may also be stored on computer-readable storage media 304 or elsewhere on remote service 110.

If profile selection module 208 is unable to determine a CBRS profile with certainty, a logistic regression model may be used on the contextual information 402 to determine a best option out of the CBRS profile library 212. If profile selection module 208 is still unable to determine a CBRS profile to select with certainty, the profile selection module 208 may request that user device 102 conduct a modem scan to look for available CBRS networks. Alternatively, the modem scan may run concurrently with the methods and systems described herein. Data regarding failures of the profile selection module 208 to suggest a CBRS network may also be used to update previous connection data for given device contexts.

Figure 5:
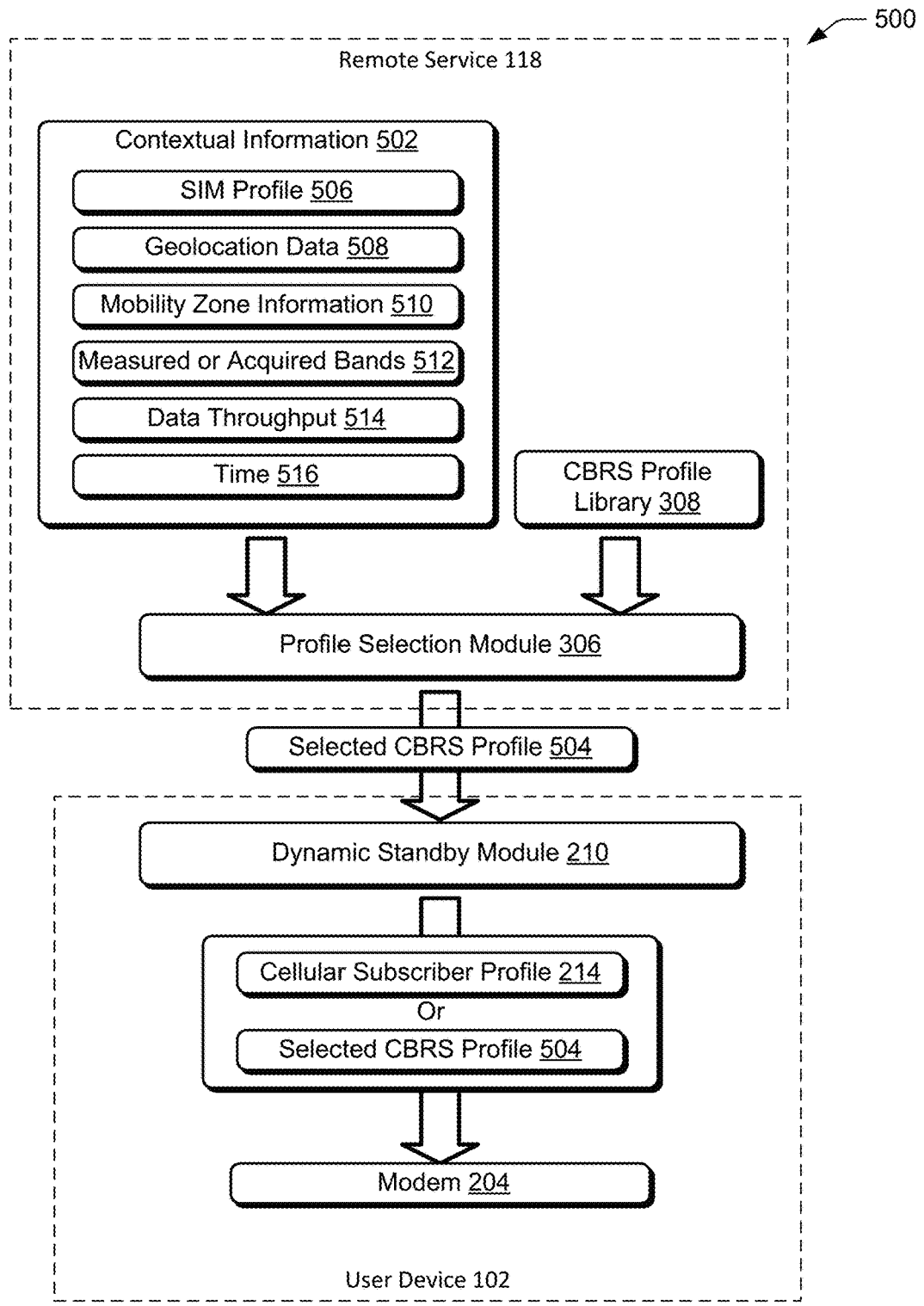
FIG. 5 illustrates details of selecting a CBRS profile by a remote service, transmitting the CBRS profile to a user device for implementation, and implementing the CBRS profile by the user device.

FIG. 5 illustrates data flows 500 of a profile selection module 208 implemented on a remote service 118 supporting CBRS profile selection and a dynamic standby module 210 implemented on a user device 102 supporting CBRS profile implementation on a user device. The profile selection module 306 receives contextual information 502 along with a CBRS profile library 308 and outputs a selected CBRS profile 504.

As discussed above, the CBRS profile library 308 contains a plurality of CBRS profiles that are available to use for CBRS communication. CBRS profiles within the CBRS profile library 308 can correspond to certain CBRS providers, CBRS network cell locations, businesses, and so on. CBRS profile library 308 may be implemented as a database of CBRS profiles that is updated based on information from at least one of the user device 102, other user devices, or CBRS providers. As will be discussed further in relation to FIG. 6, any number of usable CBRS profiles (for example within communication range of the user device) may exist in any location.

The contextual information 502 of the user device 102 may include any number of aspects that are usable by the profile selection module 306 to determine selected CBRS profile 504. These aspects may include one or more of a SIM profile 506, geolocation data 508, mobility zone information 510, measured or acquired bands 512, data throughput 514, or time information 516. Such aspects may correspond to conditions (e.g. current, historical) around user device 102 or connections of user device 102 with various CBRS network cells. The aspects may also correspond to conditions (e.g. current, historical) around other user devices or connections of the other user devices with the various CBRS network cells. Portions of contextual information 502 may be received from user device 102 such that the profile selection module 306 may leverage local information about user device 102.

The SIM profile 506 may comprise a user profile of the user device 102. In aspects, the SIM profile 506 may be the cellular subscriber profile 214 or may be a different user profile. The SIM profile 406 is the SIM profile currently selected on the user device and may be received from user device 102 or determined by remote service 118.

Geolocation data 508 may comprise a physical location or movement of user device 102 and may be determined based on information received from user device 102. Alternatively, geolocation data 508 may be determined by the user device 102 and provided to the remote service 118. Geolocation data 508 may comprise coordinates, velocity, or directional data, may be determined by the remote service 118 based on received radio signals (e.g., radio triangulation, ping, wireless connections, phone calls), or may come from another source. Geolocation data 508 is usable by profile selection module 306 to narrow CBRS profiles in CBRS profile library 308 to those that correspond to local CBRS network cells. Geolocation data 508, when periodically sent and correlated with multiple other user devices in a particular location, may give estimates of available CBRS networks at the location along with coverage details.

Mobility zone information 510 may comprise an estimated movement of the device and may utilize geolocation data 508. For example, the mobility zone information 510 may be based on changes in network data that occurred between two updates to a server in combination with a location change of the device. Mobility zone information may come from the primary cellular data network 112. The change in network data determines a network quality variation (e.g., change in signal, throughput) between the updates, that is used along with a location change (from geolocation data 508) that occurred between the two updates in order to predict the mobility zone information 510 (e.g., how far the device may go before a future network update). In this way, the gathered network data along with geolocation data 508 may be used to provide feedback to the system to improve the system's confidence level on future CBRS profile suggestions.

Measured or acquired bands 512 may comprise primary cellular network data connections, radio access technology (RAT) connections, or other currently acquired or measured networks by user device 102. Measured or acquired bands 512 may be received from user device 102 and can further include other user devices proximal to user device 102 that are determined by remote service 118. Measured or acquired bands may also comprise past measured or acquired connections from the user device 102 or from other user devices.

Data throughput 514 is based on actual data throughput received by the user device 102 or other user devices for various CBRS network cells. Data throughput 514 may be determined by remote service 118 via information from the CBRS network cells, from user device 102, or from the other user devices. Data throughput 414 may be based on current or past connections between one or more of the user device 102 or other user devices and the various CBRS network cells. Data throughput 414 may be used to rank a plurality of CBRS network cells that may all have sufficient signal strength at a given location.

Time information 516 refers to chronological information (e.g., time of day, a day of the week, a season or time of year, time intervals, holidays, current event). Because data throughput, congestion, and network load are generally all functions of these aspects, profile selection module 306 may utilize time information 516 to determine the selected CBRS profile 504.

The contextual information 502 may be compiled and analyzed by profile selection module 306 to determine a CBRS profile to select. The selected CBRS profile 504 is then sent by the profile selection module 306 to dynamic standby module 210 of the user device 102. The selected CBRS profile 504 may be transmitted directly to the user device 102 or an indication of the selected CBRS profile (e.g., number, name, id) may be transmitted to the user device 102 via any existing connection between remote service 118 and user device 102 (e.g., primary cellular data network 112). However the selected CBRS profile 504 is transmitted, the selected CBRS profile 504 is effective to allow the user device 102 to implement the selected CBRS profile 504 via dynamic standby module 210.

As discussed above, dynamic standby module 210 is able to dynamically configure modem 204 between cellular subscriber profile 214 or a currently implemented CBRS profile and the selected CBRS profile 504 (similar to existing dual-SIM dual-standby techniques). As the contextual information changes, so too may the selected CBRS profile 504. Dynamic standby module 210 receives any updates to the selected CBRS profile 504 from the profile selection module 306, such that the modem 204 is being configured with a current CBRS profile for a particular user on a particular location given the current contextual information 502. Successful CBRS connections may be stored on remote service 118 such that the system can update previous connection data for given device contexts. If profile selection module 306 is unable to determine a CBRS profile with certainty, a logistic regression model may be used on the contextual information 502 to determine a best CBRS profile to use out of the CBRS profile library 308.

If profile selection module 306 is still unable to determine a CBRS profile to select with certainty, the profile selection module 306 may request that user device 102 conduct a modem scan to look for available CBRS networks. Information about the modem scan may be received by profile selection module 306 such that profile selection module 306 can select selected CBRS profile 504 from a list of CBRS networks identified from the scan. Alternatively, the modem scan may run concurrently with the methods and systems described herein. Data regarding failures of the profile selection module 306 to suggest a CBRS network may also be used to update previous connection data for given device contexts.

Example Environments

Figure 6:
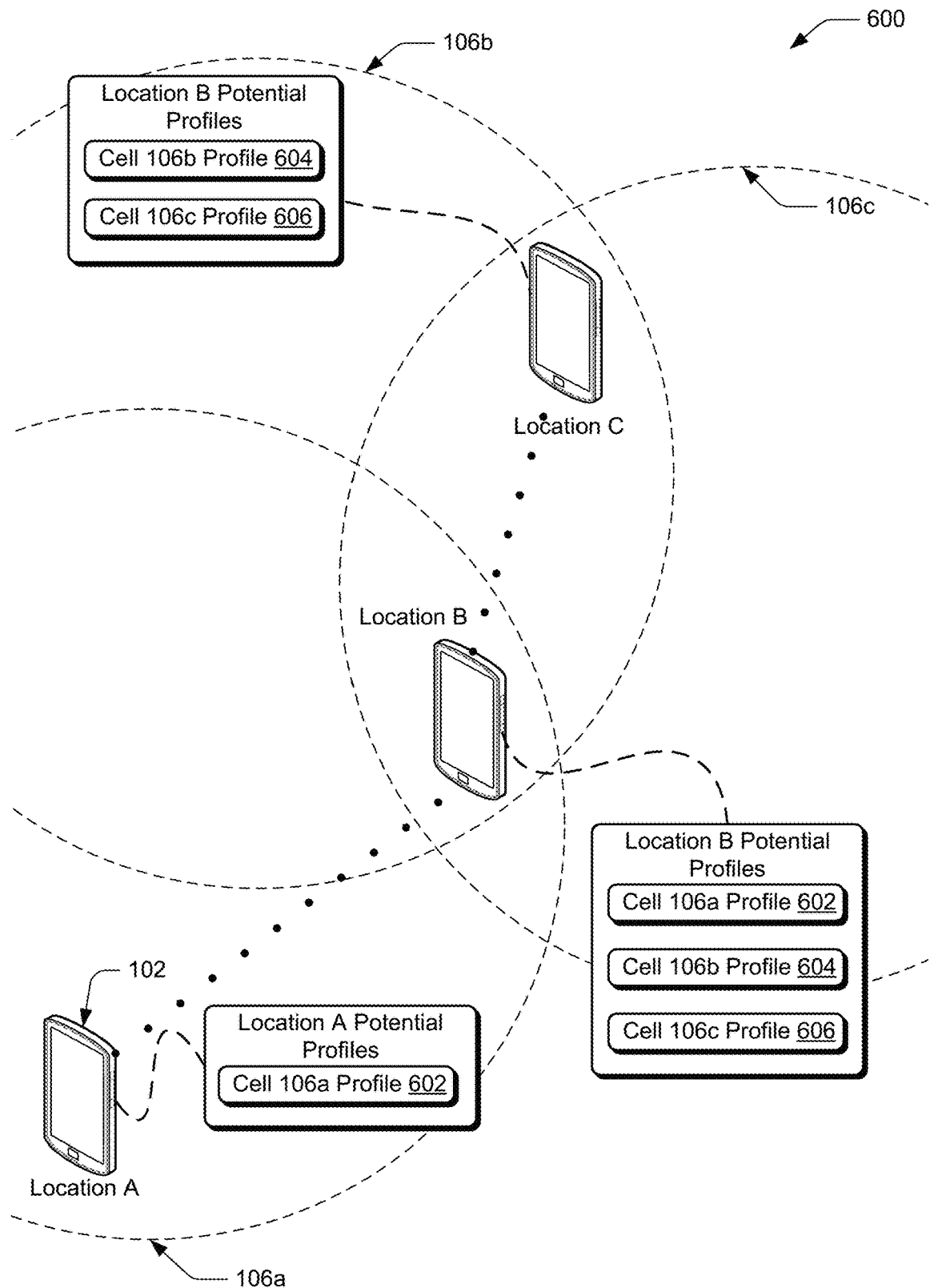
FIG. 6 illustrates three locations of a user device within an example environment similar to the example environment of FIG. 1.

FIG. 6 illustrates an example environment 600 similar to example operating environment 100 of FIG. 1 with user device 102 positioned in three example locations relative to example CBRS network cells 106a, 106b, and 106c. Location A is within CBRS network cell 106a but outside of CBRS network cells 106b and 106c. For the sake of simplicity, FIG. 6 will describe an implementation similar to FIG. 4, however, the implementation of FIG. 5 may be utilized without departing from the scope of the invention, as the profile selection is similar.

By utilizing geolocation data 408 corresponding to location A, profile selection module 208 may send CBRS network cell 106a profile 602 to dynamic standby module 210 to configure modem 204 to connect to CBRS network cell 106a. Based on other contextual information however, profile selection module 208 may determine that CBRS network cell 106a is not a reliable network, and thus, not forward any CBRS profile to dynamic standby module 210. In this case, dynamic standby module 210 would configure modem 204 with the cellular subscriber profile 214.

Location B is within cells 106a, 106b, and 106c. Thus, based on geolocation data 408, user device 102 can potentially connect to cells 106a, 106b, or 106c (using CBRS network cell 106a profile 602, CBRS network cell 106b profile 604, or CBRS network cell 106c profile 606, respectively). Based on other contextual information, profile selection module 208 may determine that CBRS network cell 106a is still the best candidate (assuming CBRS network cell 106a was chosen at location A and user device 102 moved from location A to B). Otherwise, profile selection module 208 may determine that CBRS network cell 106b profile 604 or CBRS network cell 106c profile 606 may be better candidates for data connections. In any case, profile selection module 208 may keep a previously selected CBRS profile, select a new CBRS profile, or select no CBRS profile based on a current context of user device 102.

Location C is within cells 106b and 106c but outside of CBRS network cell 106a. Thus, based on geolocation data 408, user device 102 can potentially connect to CBRS network cells 106b or 106c (using CBRS network cell 106b profile 604 or CBRS network cell 106c profile 606, respectively). Based on other contextual information, profile selection module 208 may determine that CBRS network cell 106b or CBRS network cell 106C is the best candidate. Similar to location B, profile selection module 208 may keep a previously selected CBRS profile, select a new CBRS profile, or select no CBRS profile based on a current context of user device 102.

Example Methods

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-Chip systems (SoCs), Complex Programmable Logic Devices (CPLDs), and the like. The order in which the method blocks are described in these Figures is not intended to be construed as a limitation, and any number of the described method blocks can be combined in any order to implement a method, or an alternate method.

Figure 7:
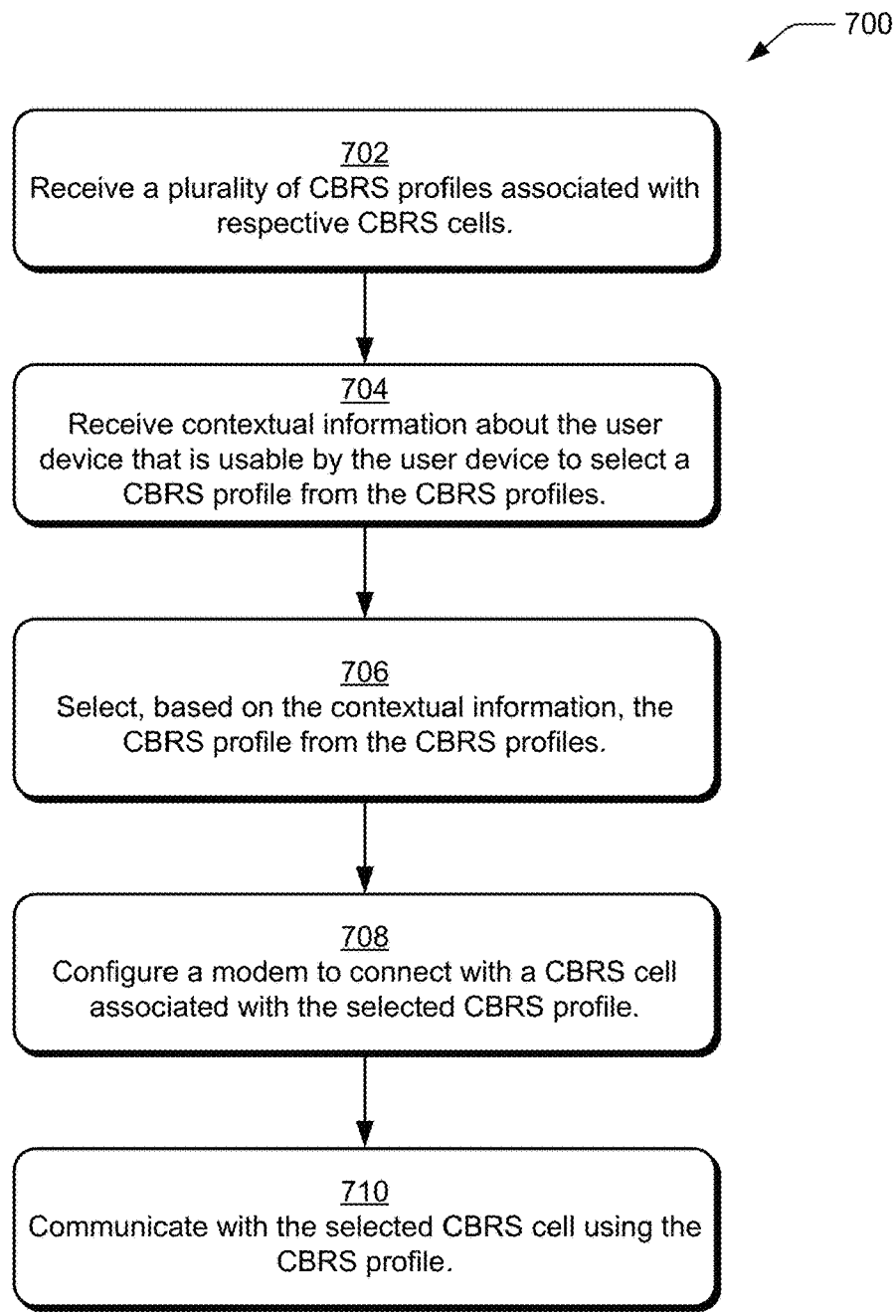
FIG. 7 illustrates an example method that a user device performs to select and implement a CBRS profile based on contextual information about the user device and/or the user device's environment.

FIG. 7 illustrates an example method 700 that user device 102 performs to select and implement a CBRS profile. The processor 202 may execute the code of the profile selection module 208 to select a CBRS profile, and the processor 202 may execute the code of the dynamic standby module 210 to cause the user device 102 to implement the selected CBRS profile.

At 702, the user device 102 receives a plurality of CBRS profiles associated with respective CBRS network cells. The plurality of CBRS profiles may be stored in CBRS profile library 212 and may have been previously acquired by user device 102.

At 704, the user device 102 receives contextual information 402 about the user device 102 or about an environment of the user device 102. The contextual information 402 is usable by the user device 102 to select a CBRS profile from a group of CBRS profiles, such as from the CBRS profile library 212. As discussed above, contextual information 402 may include at least one of a SIM profile, geolocation, mobility zone, a measured or acquired radio access technology connection (e.g., bands, primary cellular data networks, CBRS networks, other radio networks), data throughput, or time/date information. The contextual information may also comprise data that describes previous connections and/or connection attempts by the user device 102 and/or other user devices with CBRS network cells. As discussed above, contextual information 402 may be obtained locally from user device 102 (e.g. from local storage, sensors) and/or received from remote service 118.

At 706, the user device 102 performs a selection procedure to select, based on the contextual information 402, a CBRS profile (selected CBRS profile 404) from the group of CBRS profiles, such as from the CBRS profile library 212. If the user device 102 is not able to select a CBRS profile with certainty through the selection procedure, a linear regression model or a modem scan may be used to determine a best CBRS profile to select.

The user device 102 then, at 708, configures the modem 204 of the user device 102 to connect with a CBRS network cell associated with the selected CBRS profile 404. Configuring the modem 204 may involve at least one of loading the selected CBRS profile 404 directly onto the modem 204, loading the selected CBRS profile 404 into a hardware modem controller, loading the modem into a modem controlling module that is also contained within computer-readable storage media 206, or any other technique of configuring a wireless modem for communication with a specific wireless network.

At 710, the user device 102 implements the selected CBRS profile 404 and communicates with the associated CBRS network cell.

Figure 8:
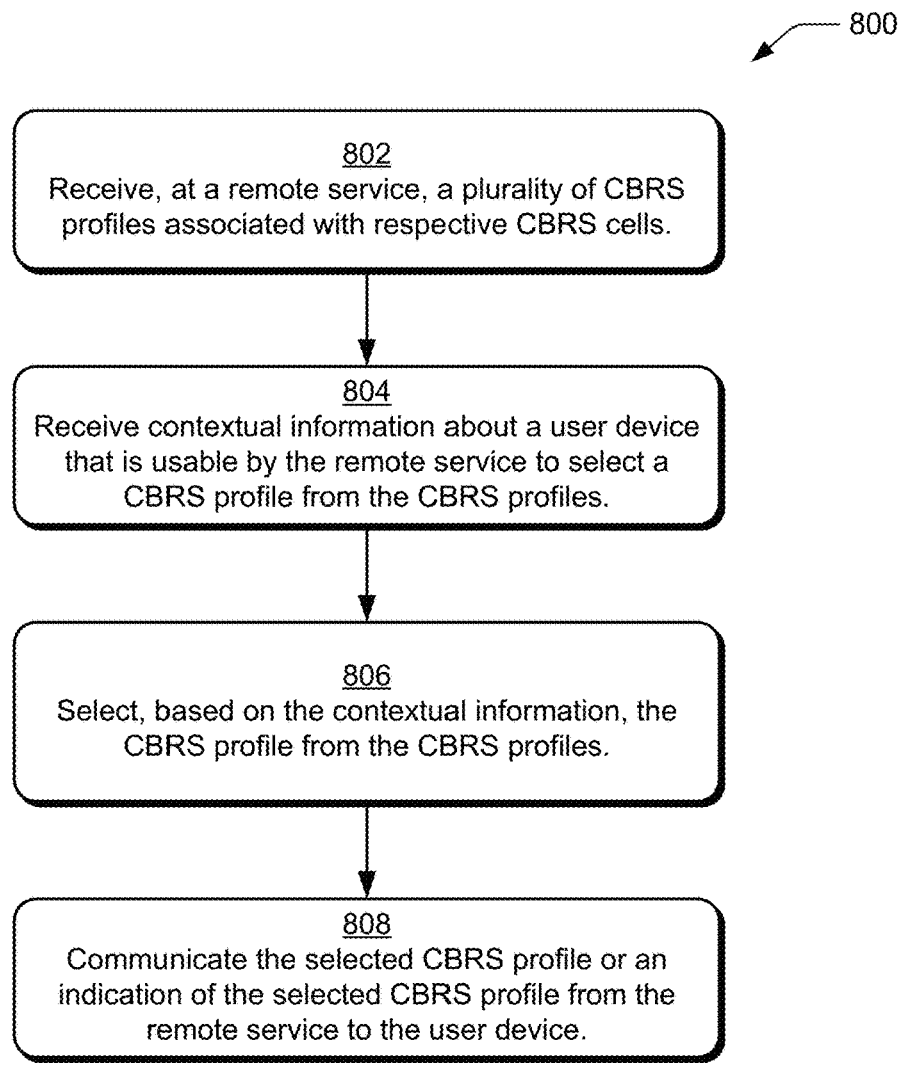
FIG. 8 illustrates an example method that a remote service performs to select a CBRS profile based on contextual information about a user device and/or the user device's environment and which causes the user device to implement the selected CBRS profile.

FIG. 8 illustrates an example method 800 that remote service 118 performs to select and transmit a CBRS profile to user device 102. The processor 302 may execute the code of the profile selection module 306 to select a CBRS profile, and the processor 302 may cause a transmission of the selected CBRS profile to the user device 102 such that the user device 102 can implement the selected CBRS profile.

At 802, the remote service 118 receives a plurality of CBRS profiles associated with respective CBRS network cells. The plurality of CBRS profiles may be stored in CBRS profile library 308 and may have been previously acquired by remote service 118.

At 804, the remote service 118 receives contextual information 502 about the user device 102 or about an environment of the user device 102. The contextual information 502 is usable by the remote service 118 to select a CBRS profile from a group of CBRS profiles, such as from the CBRS profile library 308. As discussed above, contextual information 502 may include at least one of a SIM profile, geolocation, mobility zone, a measured or acquired radio access technology connection (e.g., bands, primary cellular data networks, CBRS networks, other radio networks), data throughput, or time/date information. The contextual information may also comprise data that describes previous connections and/or connection attempts by the user device 102 and/or other user devices with CBRS network cells. As discussed above, contextual information 502 may be obtained from at least one of remote service 118 (e.g. from local storage), CBRS networks, user device 102, or other user devices.

At 806, the remote service 118 performed a selection procedure to select, based on the contextual information 502, a CBRS profile (selected CBRS profile 504) from the group of CBRS profiles, such as from the CBRS profile library 308. If the remote service 118 is not able to select a CBRS profile with certainty through the selection procedure, a linear regression model may be used to determine a best CBRS profile to select or the remote service 118 may instruct the user device 102 to perform a modem scan.

At 808 the selected CBRS profile 504 or an indication of the selected CBRS profile 504 (e.g., number, identifier, name), is communicated to user device 102 for implementation by the user device 102. The communication may be performed over any existing wired/wireless connection between user device 102 and remote service 118 (e.g., primary cellular data network 112). The connection may also comprise a currently implemented CBRS profile connecting the user device 102 to the remote service 118 (via Internet 108). The communication enables user device 102 to configure modem 204 to connect with a CBRS network cell associated with the selected CBRS profile 504. This configuration is performed similarly to 708 of FIG. 7.

Example Device

Figure 9:
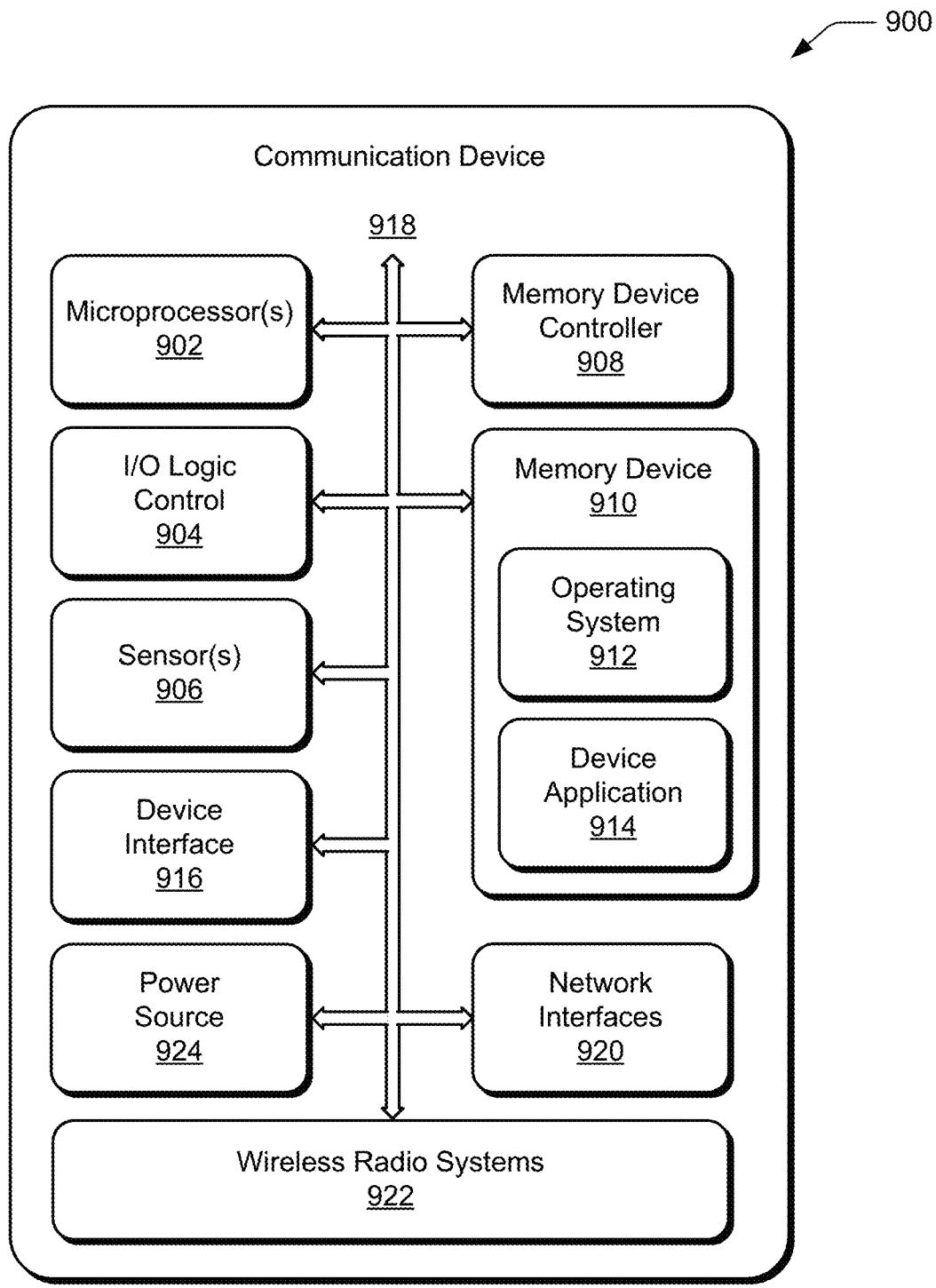
FIG. 9 illustrates an example communication device (either user device or remote service) that can be implemented in a wireless network environment in accordance with one or more aspects of the techniques described herein.

FIG. 9 illustrates an example communication device 900 that can be implemented as the user device 102 or remote service 118 in accordance with one or more aspects of selecting a CBRS profile as described herein. The example communication device 900 may be any type of user device, including but not limited to, a mobile communication device, a computing device, a client device, a mobile phone, a tablet, a communication device, an entertainment device, a gaming device, a media playback device, a charging station, and/or other type of device. The example communication device 900 may also be a server or remote entity (remote service 118) that communicates with user device 102 (e.g., to select and send an indication of a CBRS profile for use by user device 102).

The communication device 900 can be integrated with electronic circuitry, microprocessors, memory, input output (I/O) logic control, communication interfaces and components, as well as other hardware, firmware, and/or software to implement the device. Further, the communication device 900 can be implemented with various components, such as with any number and combination of different components as further described with reference to the user device 102 of FIG. 2 and the remote service 118 of FIG. 3.

In this example, the communication device 900 includes one or more microprocessors 902 (e.g., microcontrollers or digital signal processors) that process executable instructions. The device also includes an input-output (I/O) logic control 904 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 906 can be implemented to detect various properties such as acceleration, temperature, humidity, supplied power, proximity, external motion, device motion, sound signals, ultrasound signals, light signals, Global Navigation Satellite System (GNSS) signals, radio frequency (RF), other electromagnetic signals or fields, or the like. As such, the sensors 906 may include any one or a combination of temperature sensors, humidity sensors, accelerometers, microphones, optical sensors up to and including cameras (e.g., charged coupled-device, video cameras), active or passive radiation sensors, GPS receivers, or radio frequency identification detectors.

The communication device 900 includes a memory device controller 908 and a memory device 910 (e.g., computer-readable storage media 206, computer-readable storage media 304), such as any type of a nonvolatile memory and/or other suitable electronic data storage device. The communication device 900 can also include various firmware and/or software, such as an operating system 912 that is maintained as computer executable instructions by the memory and executed by a microprocessor. The device software may also include a device application 914 that implements the profile selection module 208 or the profile selection module 306 as well as the dynamic standby module 210 in accordance with aspects of selecting a CBRS profile. The computer-readable storage media described herein excludes propagating signals.

The communication device 900 also includes a device interface 916 to interface with another device or peripheral component and includes an integrated data bus 918 that couples the various components of the communication device 900 for data communication between the components. The data bus in the mesh network device may also be implemented as any one or a combination of different bus structures and/or bus architectures.

The device interface 916 may receive input from a user and/or provide information to the user (e.g., as a user interface), and a received input can be used to determine a setting. The device interface 916 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 916 may also receive inputs from any number of peripherals, such as buttons, a keypad, a switch, a microphone, or an imager (e.g., a camera device).

The communication device 900 can include network interfaces 920, such as a wired and/or wireless interface for communication with other devices via Wireless Local Area Networks (WLANs), wireless Personal Area Networks (PANs), and for network communication, such as via the Internet 108. The network interfaces 920 may include Wi-Fi, Bluetooth®, Bluetooth Low Energy (BLE), Near Field Communication (NFC), and/or IEEE 802.15.4. The communication device 900 also includes wireless radio systems 922 for wireless communication with a primary cellular data network and/or mobile broadband networks. Each of the different radio systems can include a radio device, antenna, and chipset that is implemented for a particular wireless communications technology, such as the modem 204. The communication device 900 also includes a power source 924, such as a battery to connect the device to line voltage. An alternating current (AC) power source may also be used to charge the battery of the device or the device may run on AC power alone.

Although aspects of CBRS profile selection have been described in language specific to features and/or methods, the subject of the appended claims is not necessarily limited to the specific features or methods described. Rather, the specific features and methods are disclosed as example implementations of CBRS profile selection, and other equivalent features and methods are intended to be within the scope of the appended claims. Further, various different aspects are described, and it is to be appreciated that each described aspect can be implemented independently or in connection with one or more other described aspects.

What is claimed is:

1. A method implemented by a user device comprising:
   receiving a plurality of network access profiles associated with respective networks;
   storing the plurality of network access profiles in a profile library;
   compiling contextual information indicating a context of at least one of the user device or one or more other user devices;
   selecting, using the contextual information and independent of a modem scan, a network access profile from the stored plurality of network access profiles;
   entering a region of connectivity associated with the selected network access profile;
   implementing the selected network access profile to initiate a first network connection with a network associated with the selected network access profile; and
   communicating with the network using the selected network access profile.

2. The method of claim 1, wherein implementing the selected network access profile further comprises:
   switching a current data connection profile of a modem between a current network access profile and the selected network access profile to initiate a data connection with the network associated with the selected network access profile.

3. The method of claim 1, further comprising:
utilizing a primary cellular data network subscription profile to implement a current data connection profile of a modem with a cellular network; and
wherein implementing the selected network access profile further comprises:
switching the current data connection profile of the modem between the primary cellular data network subscription profile and the selected network access profile to initiate a data connection with a network associated with the selected network access profile.

4. The method of claim 1,
wherein prior to selecting the network access profile, the method further comprises:
implementing different network access profile to initiate a second network connection with a network associated with the different network access profile; and
wherein implementing the selected network access profile further comprises:
switching a current data connection profile of a modem from the different network access profile to the selected network access profile to initiate a data connection with the network.

5. The method of claim 1,
wherein prior to determining the selected network access profile, the method further comprises:
implementing a primary cellular data network subscription profile to initiate a network connection with a primary cellular data network;
wherein prior to determining the selected network access profile, the method further comprises:
connecting through a network connection with a primary cellular data network utilizing a primary cellular data network subscription profile; and
wherein implementing the selected network access profile further comprises:
switching a current data connection profile of a modem from the primary cellular data network subscription profile to the selected network access profile to initiate a data connection with the network.

6. The method of claim 1, wherein determining the selected network access profile comprises:
receiving an indication of a selected network access profile associated with a selected network from a remote service device, wherein the selected network access profile is stored in the profile library.

7. The method of claim 1, wherein determining the selected network access profile comprises:
receiving the selected network access profile associated with a selected network from a remote service device; and
storing the selected network access profile in the profile library.

8. The method of claim 1, further comprising:
sharing at least a portion of the compiled contextual information with a remote service device.

9. The method of claim 1, further comprising:
communicating with a remote service device to request network access profile selection information.

10. The method of claim 9, wherein the network access profile selection information comprises a network access profile associated with a network.

11. A user device comprising:
a processor;
a modem; and
a computer-readable storage medium having stored thereon instructions that, responsive to execution by the processor, cause the processor to execute operations comprising:
receive a plurality of network access profiles associated with respective networks;
store the plurality of network access profiles in a profile library;
compile contextual information indicating a context of at least one of the user device or one or more other user devices;
select, using the contextual information and independent of a modem scan, a network access profile from the stored plurality of network access profiles;
enter a region of connectivity associated with the selected network access profile;
implement the selected network access profile to initiate a first network connection with a network associated with the selected network access profile; and
communicate with the network using the selected network access profile.

12. The user device of claim 11, wherein the operation of implement the selected network access profile includes the processor executing at least one operation further comprising:
switch a current data connection profile of the modem between a current network access profile and the selected network access profile to initiate a data connection with the network associated with the selected network access profile.

13. The user device of claim 11, wherein the instructions cause the processor to execute further operations comprising:
utilize a primary cellular data network subscription profile to implement a current data connection profile of the modem with a cellular network; and
wherein the operation of implement the selected network access profile includes the processor executing at least one operation further comprising:
switch the current data connection profile of the modem between the primary cellular data network subscription profile and the selected network access profile to initiate a data connection with a network associated with the selected network access profile.

14. The user device of claim 11,
wherein prior to the operation of select the selected network access profile, the instructions cause the processor to execute at least one operation further comprising:
implement a different network access profile to initiate a second network connection with a network associated with the different network access profile; and
wherein the operation of implement the selected network access profile includes the processor executing at least one operation further comprising:
switch a current data connection profile of the modem from the different network access profile to the selected network access profile to initiate a data connection with the network.

15. The user device of claim 11,
wherein prior to the operation of determine the selected network access profile, the instructions cause the processor to execute at least one operation further comprising:

implement a primary cellular data network subscription profile to initiate a network connection with a primary cellular data network;

wherein prior to the operation of determine the selected network access profile, the instructions that cause the processor to execute at least one operation further comprising:

utilize a primary cellular data network subscription profile to connect through a network connection with a primary cellular data network; and wherein the operation of implement the selected network access profile further includes the processor executing at least one operation further comprising:

switch a current data connection profile of the modem from the primary cellular data network subscription profile to the selected network access profile to initiate a data connection with the network.

16. The user device of claim 11, wherein the operation of determine the selected network access profile includes the processor executing at least one operation further comprising:

receive an indication of a selected network access profile associated with a selected network from a remote service device, wherein the selected network access profile is stored in the profile library.

17. The user device of claim 11, wherein the operation of determine the selected network access profile includes the processor executing at least one operation further comprising:

receive the selected network access profile associated with a selected network from a remote service device; and store the selected network access profile in the profile library.

18. The user device of claim 11, wherein the instructions cause the processor to execute further operations comprising:

share at least a portion of the compiled contextual information with a remote service device.

19. The user device of claim 11, wherein the instructions cause the processor to execute further operations comprising:

communicate with a remote service device to request network access profile selection information.

20. The user device of claim 19, wherein the network access profile selection information comprises a network access profile associated with a network.

\* \* \* \* \*